Aug. 23, 1932.  E. J. FISCHER  1,872,919
HYDRAULIC SPRING AND SHOCK ABSORBING DEVICE
Filed July 26, 1928
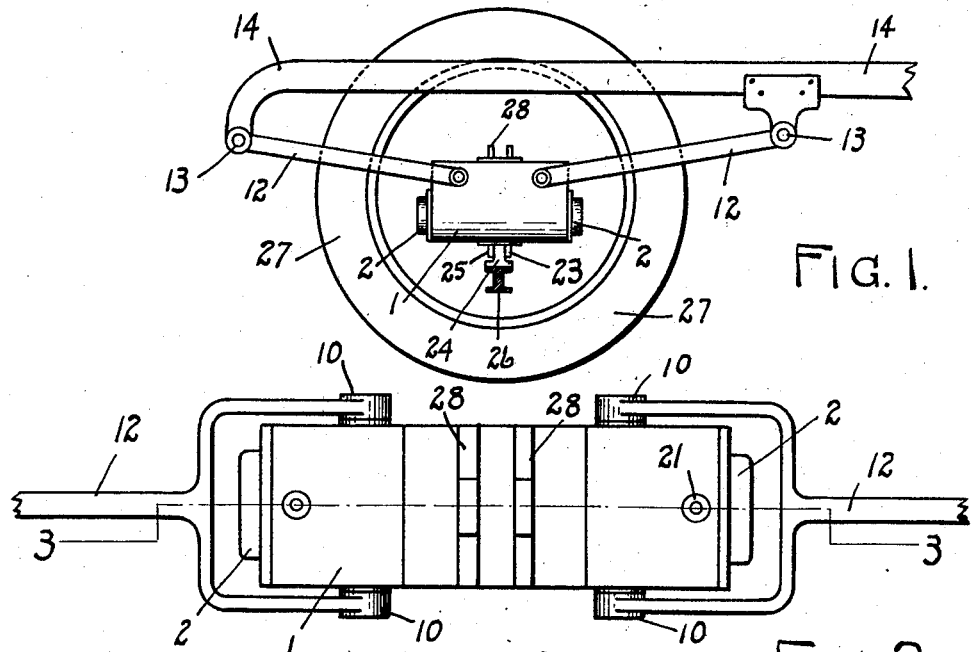
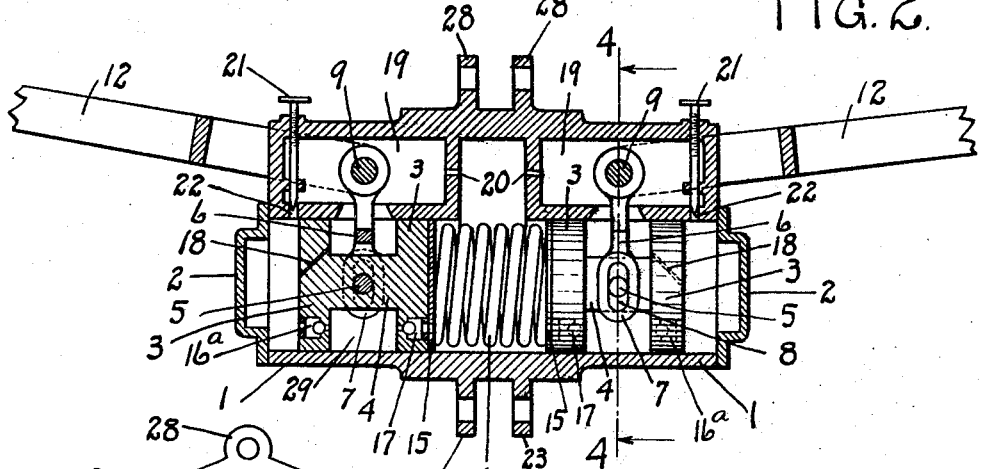
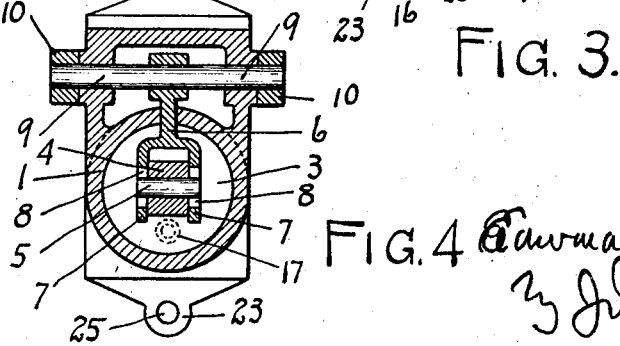
INVENTOR.
Edward J. Fischer
ATTORNEY Patented Aug. 23, 1932

1,872,919

UNITED STATES PATENT OFFICE

EDWARD J. FISCHER, OF COVINGTON, KENTUCKY, ASSIGNOR OF ONE-HALF TO FRANK A. AMAN

HYDRAULIC SPRING AND SHOCK ABSORBING DEVICE

Application filed July 26, 1928. Serial 295,570.

I have invented a new spring and shock absorbing device for automobiles and motor driven vehicles, which device is simple in construction and eliminates springs, which are subject to breakage, and combines a very efficient shock absorber and resilient riding qualities without the use of flat springs. The device operates equally well in summer or winter as the liquid used therein is non-freezing. It also provides a means of side action without strain on any of its parts, by reason of the mounting on the machine which is accomplished by the gears 23 engaging on the bracket 24.

The device can be attached to any make of automobile, either at the chassis and axle as shown or to the frame of the automobile as some makes of cars have.

In the accompanying drawing forming part of the specification:

Fig. 1 is a side view of the device shown in position, of an angle of the automobile, Fig. 2 is a plan view with the levers broken off, Fig. 3 is a section taken on line 3, 3 of the part shown in Fig. 2, and Fig. 4 is a section taken on line 4, 4 of the parts shown in Fig. 3.

The device is formed of a cylinder 1, having the sides 2, which are secured to the cylinder 1. Inside the cylinder 1 I provide pistons or plungers 3, which are of the opposed type. Pistons 3 are provided with necks 4 through which I place pins 5. Engaging on these pins, I have the arms 6, having bifurcated ends 7, said bifurcated ends having slots 8 which engage the pins 5. At the opposite ends of the lever 6, I securely mount the pins 9 at their centers. At the ends of the pins 9, I securely mount the ends 10 of the long levers 12. The opposite ends of the lever 12 being pivotally mounted in the bearings 13 of the chassis 14. Fastened to the inner surfaces of the pistons 3 I have the fibre washers 15. These washers are to prevent wear on the spring 16 and also to eliminate noise. In the pistons 3 I provide ball valves 16a at the outer ends of the pistons and ball valves 17 at the inner ends of the piston.

I also provide small bi-passes 18 in the pistons 3. Above the cylinder 1, I provide oil chambers 19, said oil chambers being provided with bi-passes 20. Needle valves 21 are located in the oil chambers 19 and are to adjust the openings 22 which form bi-passes into the oil chambers 19. At the lower part of the cylinder 1, I provide ears 23 between which bracket 24 engages on the pins 25. This bracket, in turn, is secured to the axle 26 of the automobile. It will be seen that this construction will allow a side motion to the automobile when one side or one wheel passes over an obstruction. This method will also prevent any forward or rearward action at the wheel 27 when said wheel is passing over an obstruction, and the large extending arms 12 provide a means of up and down motion as the wheels pass over the obstruction. At the upper part of the oil chamber 19 I provide a pair of ears 28 which are similar in design as the ears 23. These are for the purpose of securing the device to the automobile when the angle bar is above as in some makes of automobiles.

The device is operated in the following manner: As the wheel 27 passes over an obstruction, said wheel bears upwardly on the arms 12, which causes the pistons 3 to travel inwardly or against themselves, and spring 16 forming an equalizer, returns pistons 3 back to normal when the obstruction is passed over. As the pistons 3 travel toward themselves or inwardly, the liquid is forced quickly through the valves 16 and a very slow returning action is permitted by reason of the bi-passes 18 and to regulate the action of the pistons 3 and needle valves 21 are adjusted as the occasion may require, and the liquid which passes into the oil chamber 19 is allowed to return to its original source through the bi-pass openings 20, the valves 17 are also provided for a quick return of the liquid that may form in the recess 29 of the pistons 3. The arms 12 are placed at the upper portion of the device to help eliminate seepage.

I do not wish to confine myself to the specific construction herein set forth, and it is obvious that I may change the construction to some extent and I claim all such changes and modifications which fall within the scope of this specification and claims.

What I claim as new and my invention and desire to secure by Letters Patent is:—

1. In a combination spring and hydraulic vehicle shock absorber, a cylinder casing, pistons within said cylinder casing having a spring tensioned therebetween, said pistons having annular recesses, vehicle supporting members, chambers in said shock absorber into which said members extend, said cylinder casing being provided with passages from the recesses in said pistons into said chambers, mechanical means connecting said vehicle supporting members with said pistons, said recesses and chambers forming a reservoir for liquid, and said pistons having means therein for permitting the passage of compressed liquid from said cylinder into said reservoir.

2. In a combination spring and hydraulic vehicle shock absorber, a cylinder casing, pistons within said cylinder casing having a spring tensioned therebetween, said pistons having annular recesses, vehicle supporting members, chambers in said shock absorber into which said members extend, said cylinder casing being provided with passages from the recesses in said pistons into said chambers, mechanical means connecting said vehicle supporting members with said pistons, said recesses and chambers forming a reservoir for liquid, and said pistons having means therein for permitting the passage of compressed liquid from said cylinder into said reservoir, said means comprising ball check valves in said pistons.

3. In a combination spring and hydraulic vehicle shock absorber, a cylinder casing, pistons within said cylinder casing having a spring tensioned therebetween, said pistons having annular recesses, vehicle supporting members, chambers in said shock absorber into which said members extend, said cylinder casing being provided with passages from the recesses in said pistons into said chambers, mechanical means connecting said vehicle supporting members with said pistons, said recesses and chambers forming a reservoir for liquid, and said pistons having means therein for permitting the passage of compressed liquid from said cylinder into said reservoir, said means comprising ball check valves in said pistons and by-passes extending through said pistons.

4. In a combination spring and hydraulic vehicle shock absorber, a cylinder casing, pistons within said cylinder casing having a spring tensioned therebetween, said pistons having annular recesses, vehicle supporting members, chambers in said shock absorber into which said members extend, said cylinder casing being provided with passages from the recesses in said pistons into said chambers, mechanical means connecting said vehicle supporting members with said pistons, said recesses and chambers forming a reservoir for liquid, and said pistons having means therein for permitting the passage of compressed liquid from said cylinder into said reservoir, said means comprising ball check valves in said pistons, and said cylinder casing having adjustable valves for regulating the quantity of compressed fluid by-passed from said cylinder into said reservoir.

5. In a combination spring and hydraulic vehicle shock absorber, a cylinder casing, pistons within said cylinder casing having a spring tensioned therebetween, said pistons having annular recesses, vehicle supporting members, chambers in said shock absorber into which said members extend, said cylinder casing being provided with passages from the recesses in said pistons into said chambers, mechanical means connecting said vehicle supporting members with said pistons, said recesses and chambers forming a reservoir for liquid, and said pistons having means therein for permitting the passage of compressed liquid from said cylinder into said reservoir, said mechanical means comprising pivoted levers to which said supporting members are connected.

In testimony whereof, I affix my signature, at the city of Cincinnati, county of Hamilton, and State of Ohio, this 24th day of July, 1928.

EDWARD J. FISCHER.